US009729413B2

(12) United States Patent
Cook et al.

(10) Patent No.: US 9,729,413 B2
(45) Date of Patent: Aug. 8, 2017

(54) APPARATUS AND METHOD FOR IDENTIFYING DOMAIN NAME SYSTEM TUNNELING, EXFILTRATION AND INFILTRATION

(71) Applicant: Cloudmark, Inc., San Francisco, CA (US)

(72) Inventors: Neil Cook, Somerset (GB); Olivier Lemarié, Sunnyvale, CA (US); Mark Richard Stemm, Santa Monica, CA (US)

(73) Assignee: Coudmark, Inc., San Francisco, CA (US)

( * ) Notice: Subject to any disclaimer, the term of this patent is extended or adjusted under 35 U.S.C. 154(b) by 325 days.

(21) Appl. No.: 14/508,987

(22) Filed: Oct. 7, 2014

(65) Prior Publication Data
US 2016/0099852 A1 Apr. 7, 2016

(51) Int. Cl.
*H04L 12/26* (2006.01)
*H04L 12/851* (2013.01)
*H04L 29/06* (2006.01)

(52) U.S. Cl.
CPC ......... *H04L 43/08* (2013.01); *H04L 47/2425* (2013.01); *H04L 63/0272* (2013.01); *H04L 63/1466* (2013.01)

(58) Field of Classification Search
CPC . H04L 47/2425; H04L 43/08; H04L 43/0811; H04L 63/0272; H04L 63/1466
See application file for complete search history.

(56) References Cited

U.S. PATENT DOCUMENTS

| 7,441,429 B1 * | 10/2008 | Nucci | H04L 63/1416 370/230 |
| 8,544,100 B2 * | 9/2013 | Ramcharran | H04L 63/0428 726/25 |

(Continued)

FOREIGN PATENT DOCUMENTS

| WO | 01/04767 A1 | 1/2001 |
| WO | WO 01/04767 A1 * | 1/2001 |

OTHER PUBLICATIONS

Farnham, "Detecting DNS Tunneling", Feb. 25, 2013, entire document.*

(Continued)

*Primary Examiner* — Michael C Lai
(74) *Attorney, Agent, or Firm* — Cooley LLP

(57) ABSTRACT

A machine includes a processor and a memory connected to the processor. The memory stores instructions executed by the processor to preserve a second level domain, track requests for subdomains of the second level domain, determine the size of encoded subdomain data and determine the size of response data for subdomain requests. When the ratio of the number of unique subdomains versus the number of subdomain requests is over a first threshold a first satisfied condition is established. It is determined, in response to the first satisfied condition, when the size of the subdomain data exceeds a second threshold and the size of response data exceeds a third threshold to establish a second satisfied condition corresponding to deemed domain name system tunnel activity. It is determined, in response to the first satisfied condition, when the size of the subdomain data exceeds the second threshold to establish a third satisfied condition corresponding to deemed domain name system data exfiltration activity.

17 Claims, 4 Drawing Sheets

(56) References Cited

U.S. PATENT DOCUMENTS

| | | |
|---|---|---|
| 2007/0226796 A1 | 9/2007 | Gilbert et al. |
| 2012/0054860 A1 | 3/2012 | Wyschogrod et al. |
| 2012/0110165 A1* | 5/2012 | Thomas ............ H04L 29/12066 709/224 |
| 2012/0304286 A1* | 11/2012 | Croll ................... G06F 21/6263 726/22 |
| 2013/0263273 A1 | 10/2013 | Ramcharran |

OTHER PUBLICATIONS

Connery, "DNS Response Policy Zones History, Overview, Usage and Research", Jun. 15, 2013, entire document.*

Born et al., "Detecting dns tunnels using character frequency analysis", Apr. 8, 2010, retrieved from <http://arxiv .org/ftp/arxiv/papers/1 004/1 004.4358 .pdf>, entire document.

Connery, "DNS Response Policy Zones History, Overview, Usage and Research", Jun. 15, 2013, Retrieved from <https:/ldnsrpz.info/RPZ-History-Usage-Research.pdf>, entire document.

International Search Report and Written Opinion issued to International Patent Application No. PCT/US2015/053957, Dec. 23, 2015, 10 pgs.

Farnham, "Detecting DNS Tunneling", Feb. 25, 2013, retrieved from <https:/lwww .sans.org/reading-roomtwhitepapers/dns/detecting-dns-tunneling-34152>, entire document.

* cited by examiner

APPARATUS AND METHOD FOR IDENTIFYING DOMAIN NAME SYSTEM TUNNELING, EXFILTRATION AND INFILTRATION

FIELD OF THE INVENTION

This invention relates generally to traffic processing in computer networks. More particularly, this invention relates to techniques for identifying a domain name system tunnel, exfiltration and infiltration.

BACKGROUND OF THE INVENTION

The Domain Name System (DNS) is a hierarchical distributed naming system for devices connected to the Internet or a private network. The DNS translates easily memorized domain names to the numerical IP addresses needed to locate devices. For example, the domain name www.example.com translates to the addresses 93.184.216.119 (IPv4) and 2606:2800:220:6d:26bf:1447:1079:aa7 (IPv6).

A domain name comprises one or more parts, called labels, which are concatenated and delimited by dots. For the domain www.example.com, the right-most label expresses the top-level domain; in this case the top-level domain is "com". The hierarchy moves from right to left. Each label to the left specifies a subdomain of the domain to the right. Relying upon the same example, the label "example" is a subdomain of the "com" domain, while "www" is a subdomain of "examples.com". Subdomains may have up to 127 levels.

The DNS may be used for nefarious purposes. Consider network 100. An attack machine 101 operates as a command and control center for an exploit. In particular, the attack machine 101 uses network 102 to access a set of compromised machines 104_1, 104_2 through 104_N. Machine 104_N resides in a local network infrastructure 106 (e.g., an Internet Service Provider or ISP). An open resolver 107 and name server 108 also reside in the network 106. Network 106 is connected to another network 110, which is coupled to a target name server 112, which is an authoritative name server. The authoritative name server 112 is responsible for supported domains. The authoritative name server 112 may delegate authority over subdomains to other name servers, such as recursive name server 108.

Attack machine 101 and/or one or more of the compromised machines 104 may form a DNS tunnel. That is, DNS protocols are used to tunnel to other protocols, such as the Hypertext Transport Protocol (HTTP) or the Secure Socket Layer (SSL) protocol. The same machines may be used for data exfiltration, which is data leakage, such as file transfers using DNS. These are common techniques to get around paid WiFi hotspots or to gain access to resources bypassing other methods of network protection. The DNS is a convenient protocol for doing this since the design of the DNS requires that a DNS resolver infrastructure attempt to find information about a given domain by contacting the Authoritative server on the Internet, if the result isn't already cached locally. This means that DNS requests can be crafted in such a way as to force cache misses that result in a connection to a specific server.

DNS tunneling and exfiltration techniques take advantage of these architectural constructs by crafting unique subdomains and resource record (RR) responses. DNS tunneling systems typically encode the outgoing payload as an encoded (e.g., base 32) subdomain sent to a tunneling server that is masquerading as an Authoritative server. The response from the server is typically encoded (e.g., base 32) into the RR. Typically TXT or CNAME records are used to carry the payload back to the client and session data is packed into the payload. Other records may also be exploited. There are a number of available client/server systems available for DNS tunneling that facilitate this functionality.

Similarly, data exfiltration packs the payload into an encoded subdomain. In contrast to tunneling, the response is typically very small and used to maintain session or receipt notification. Since the DNS uses the User Datagram Protocol (UDP) it can be lossy; the response typically indicates success receiving the last packet of data.

Data infiltration can be achieved using similar techniques where the payload is encoded in an RR response and the response in the subdomain is merely session data.

In view of the foregoing, it would be desirable to establish techniques for identifying DNS tunneling, exfiltration and infiltration.

SUMMARY OF THE INVENTION

A machine includes a processor and a memory connected to the processor. The memory stores instructions executed by the processor to preserve a second level domain, track requests for subdomains of the second level domain, determine the size of encoded subdomain data and determine the size of response data for subdomain requests. When the ratio of the number of unique subdomains versus the number of subdomain requests is over a first threshold a first satisfied condition is established. It is determined, in response to the first satisfied condition, when the size of the subdomain data exceeds a second threshold and the size of response data exceeds a third threshold to establish a second satisfied condition corresponding to deemed domain name system tunnel activity. It is determined, in response to the first satisfied condition, when the size of the subdomain data exceeds the second threshold to establish a third satisfied condition corresponding to deemed domain name system data exfiltration activity.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
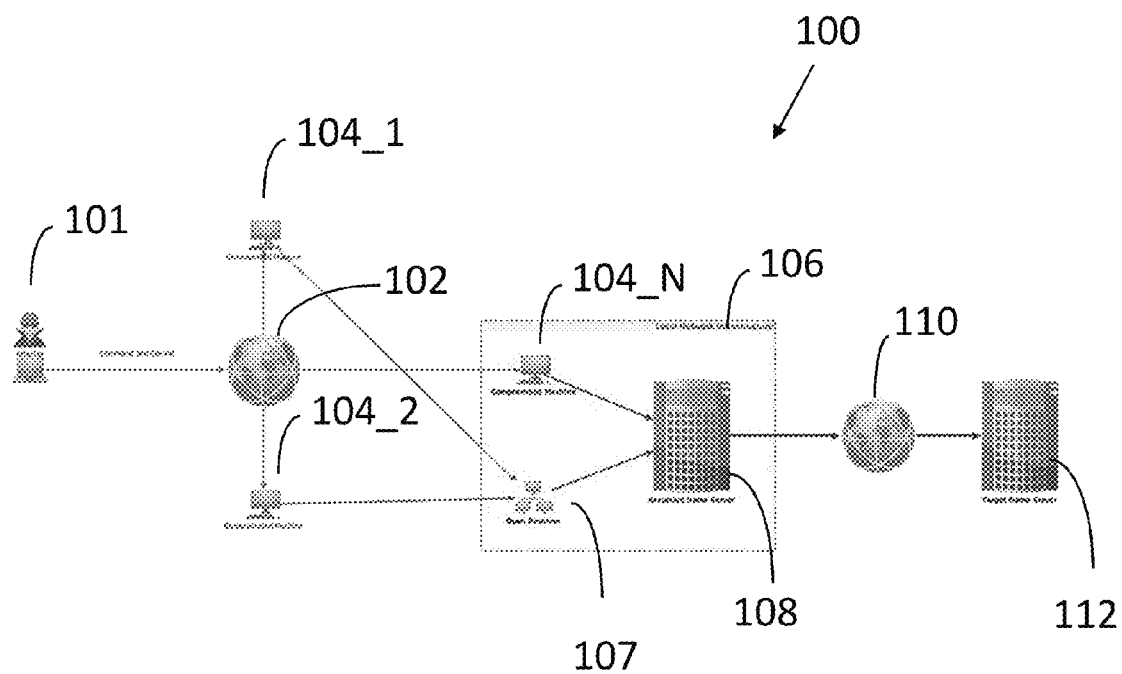
FIG. 1 illustrates a prior art network susceptible to DNS tunneling, exfiltration and infiltration attacks.
Figure 2:
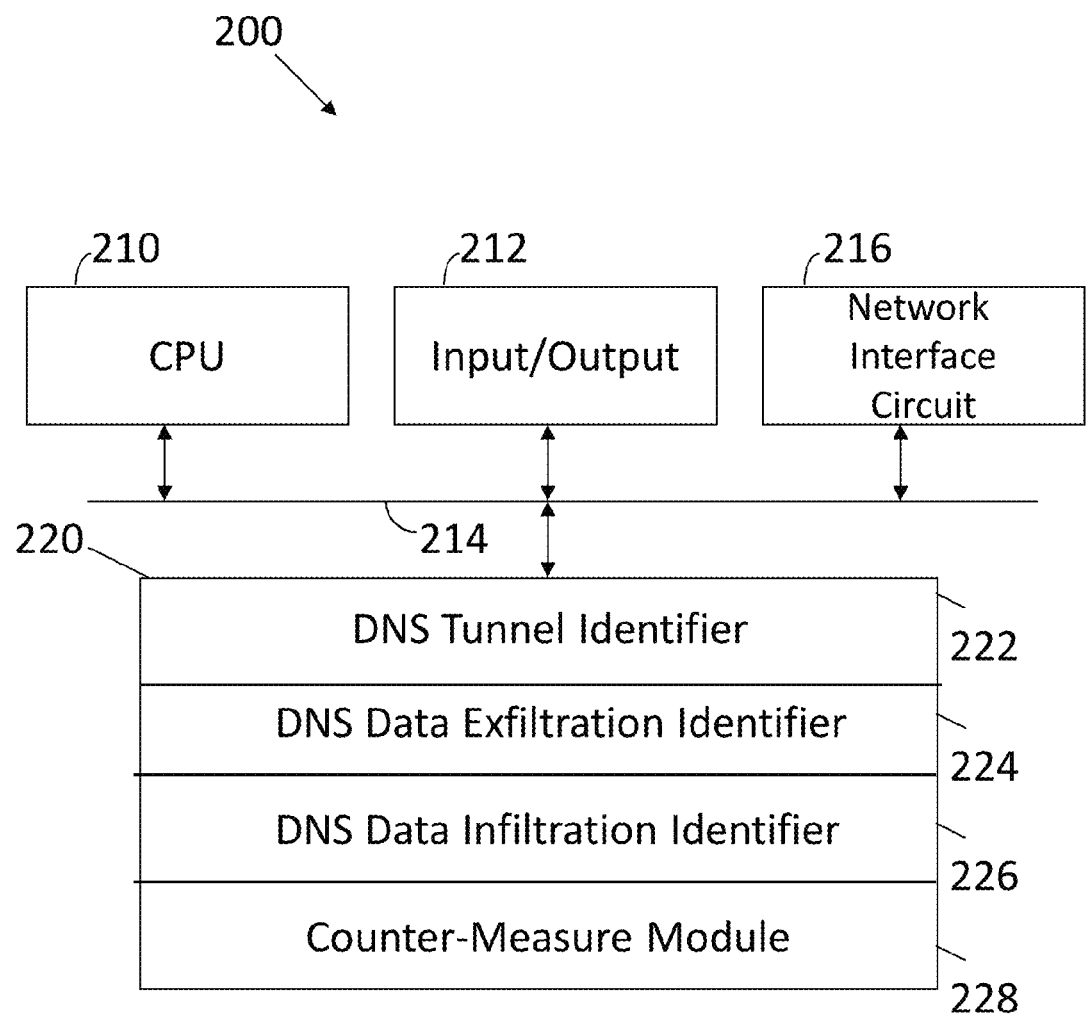
FIG. 2 illustrates a machine configured in accordance with an embodiment of the invention.

FIG. 2 illustrates a machine 200 configured in accordance with an embodiment of the invention. The machine 200 includes standard components, such as a central processing unit 210 connected to input/output devices 212 via a bus 214. The input/output devices 212 may include a keyboard, mouse, touch display and the like. A network interface circuit 216 is also connected to the bus 214. The network interface circuit 216 provides connectivity to a network, which may be any combination of wired and wireless networks. A memory 220 is also connected to the bus 214. The memory 220 stores instructions executed by the central processing unit 210 to implement operations of the invention. In one embodiment, the memory 220 stores a DNS tunnel identifier 222, which includes instructions to identify DNS tunnel activity. The memory 220 may also store a DNS data exfiltration module 224, which includes instructions to identify DNS data exfiltration activity. The memory 220 also stores a DNS data infiltration identifier 226, which includes instructions to identify DNS data infiltration activity. Finally, the memory 228 stores a counter-measure module 228, which includes instructions to perform one or more counter-measures in response to identified nefarious activity. Machine 200 may be dedicated to identifying the specified activities. Alternately, modules 222, 224, 226 and/or module 228 may be incorporated into a recursive name server or other networked resource.

Figure 3:
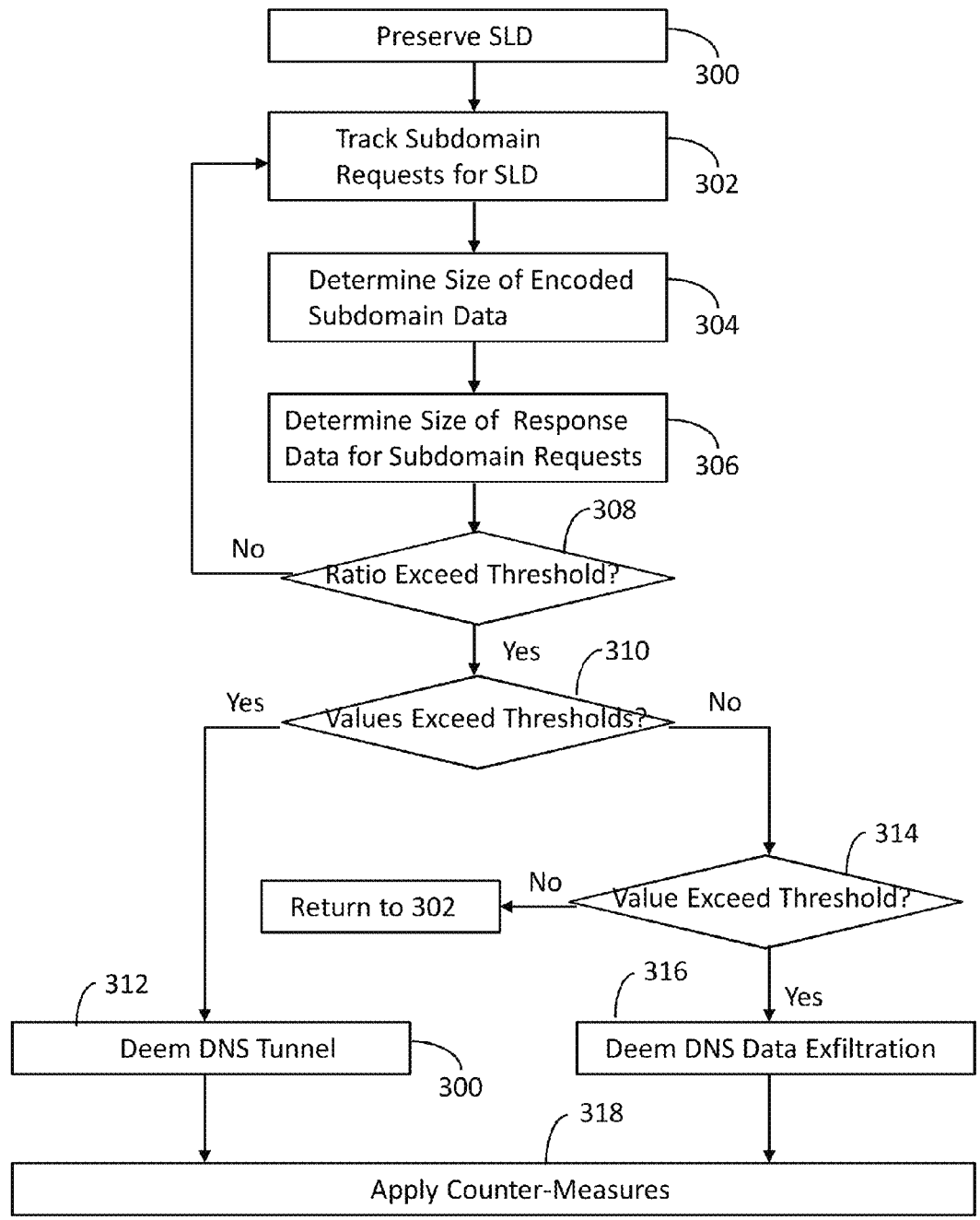
FIG. 3 illustrates processing operations to identify DNS tunneling and exfiltration.

FIG. 3 illustrates processing operations associated with an embodiment of the DNS tunnel identifier 222 and DNS data exfiltration identifier 224. Initially, a DNS request is received and a second level domain (SLD) is preserved 300. For example, an SLD of "example.com" may be preserved. A reputation entry for this SLD may also be recorded. Consider an example domain abcdefg.example.com. The SLD is example.com. The prepended subdomain abcdefg is compared against a cardinality set. If that value is already present in the cardinality set, there is no change in the cardinality set. If it is not present, then the subdomain is added to the cardinality set. Any query of the cardinality set returns a value that represents the number of unique entries in the set.

Next, the number of unique subdomain requests for the SLD is tracked 302. A sliding time window may be used in this operation. Examples of unique subdomains include abscdefg.example.com and hijklmn.example.com.

Next, the size of encoded subdomain data is determined 304. The size of response data for each unique subdomain requests is then determined 306. A ratio is then compared against a threshold 308. In particular, the ratio of the number of unique subdomains versus the number of requests is compared to a first threshold with a value at or around 0.65. If the threshold is not exceeded (308—No) control returns to block 302. If the threshold is exceeded (308—Yes) then the size of the subdomain data is compared to a second threshold and the size of the response data is compared to a third threshold. By way of example, the second threshold may be between 50 and 120, and be set at or around 62. By way of example, the third threshold may be between 100 and 500, and be set at or around 112.

If the second and third thresholds are exceeded (310—Yes) the activity is deemed a DNS tunnel 312. If both values tested in block 310 are not satisfied (310—No), the size of the subdomain data is once again compared to the second threshold. If the subdomain data size exceeds the second threshold (314—Yes), the activity is deemed to be DNS data exfiltration 316. Otherwise (314—No), control returns to block 302. Exfiltration identification may also require a check of the ratio of requests to responses; the ratio should be close to one. A check may also be made to confirm that the volume of response data is below a certain threshold. The processing of FIG. 3 may also include a check of a minimum packet size ratio. For example, if the number of requests greater than 50 bytes is more than 65% and the number of responses greater than 100 bytes is more than 50% a DNS tunnel exists. In the case of exfiltration, the threshold on minimum response packet size is ignored.

Counter measures may be applied 318 in the event of a deemed DNS tunnel or a deemed DNS data exfiltration. The counter-measure module 228 may be used to apply or invoke counter-measures. For example, Response Policy Zone (RPZ) is a mechanism for use in DNS recursive resolvers to allow customized handling of domain name information zones. Commercial services are available with DNS RPZ feeds to help protect against malicious domains as they begin to be reported. Counter-measures may include blocking known rogue domains associated with DNS tunneling, exfiltration or infiltration.

The processing of FIG. 3 may be performed in connection with query SLDs and source IP addresses. Source IP addresses may use slightly lower thresholds. The cardinality of source IP addresses querying a domain may be tracked. The number of requests may be divided by the number of unique IP addresses. This provides a number of requests per unique IP address, which must exceed a threshold before the operations of blocks 308, 310 and 314 are performed.

Variations on the identification of exfiltration activity may be used. For example, a condition may specify that the total volume of responses must be less than the total volume of requests. The thresholds for volume of requests/responses for a domain/IP to be considered as exfiltration may be different from those used for tunneling. The threshold for the ratio of number of unique subdomains versus number of requests may be higher.

Further refinements for the detection of tunneling may include tracking the specific request types (Resource Records being requested) to have more granularity on the thresholds being applied. Queries for A records may have different thresholds because the RR has limited data space compared to CNAME or TXT or ANY requests that carry a much larger payload limit.

Figure 4:
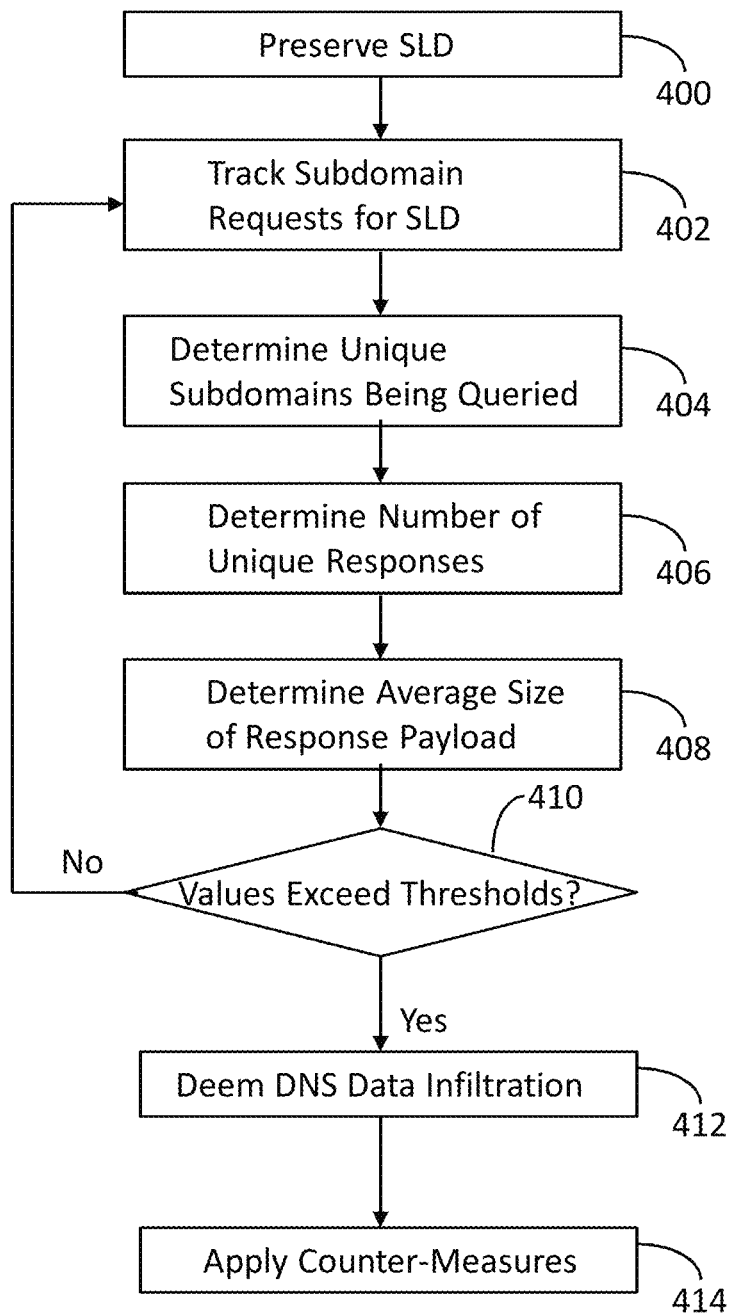
FIG. 4 illustrates processing operations to identify DNS infiltration

FIG. 4 illustrates processing operations performed by an embodiment of the DNS data infiltration identifier 226. Initial operations 400 and 402 correspond to operations 300 and 302 discussed in connection with FIG. 3. Next, a number of values are collected. In particular, the number of unique subdomains being queried is determined 404, the number of unique responses is determined 406 and the average size of the response payload is determined 408. The collected values are compared to specified thresholds. By way of example, the unique subdomains being queried threshold may be between 0 and 1, and be set at or around 0.25. The unique response threshold may be between 0.5 and 1.0, and be set at or around 0.65. The average size response payload threshold may be between 50 and 112, and be set at or around 0.62. If each threshold is exceeded (410—Yes), the traffic is deemed DNS data infiltration. Otherwise (410—No), control returns to block 402. Counter-measures may be applied 414 to the traffic.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a processor;
a network interface circuit connected to the processor and a network to collect network traffic; and
a memory connected to the processor, the memory storing instructions executed by the processor to
preserve a second level domain associated with the network traffic,
track requests in the network traffic for subdomains including unique subdomains of the second level domain,
determine the size of encoded subdomain data within the network traffic, wherein the encoded subdomain data is an outgoing payload of encoded subdomain data sent to a tunneling server,
determine the size of response data for subdomain requests in the network traffic,
identify when the ratio of a number of unique subdomain requests in the network traffic versus the number of requests in the network traffic for subdomains of the second level domain is over a first threshold to establish a first satisfied condition, and
determine, in response to the first satisfied condition, when the size of encoded subdomain data within the network traffic exceeds a second threshold and the size of response data for subdomain requests in the network traffic exceeds a third threshold to establish a second satisfied condition designated as domain name system tunnel activity.

2. The machine of claim 1 wherein the memory storing instructions executed by the processor includes instructions to determine, in response to the first satisfied condition, when the size of the subdomain data in the network traffic exceeds the second threshold to establish a third satisfied condition designated as domain name system data exfiltration activity.

3. The machine of claim 2 wherein the memory storing instructions executed by the processor includes instructions to confirm that the ratio of the number of subdomain requests in the network traffic to the number of subdomain responses is approximately one.

4. The machine of claim 3 wherein the memory storing instructions executed by the processor includes instructions to confirm that the size of response data for subdomain requests in the network traffic is below a specified threshold.

5. The machine of claim 4 wherein the memory storing instructions executed by the processor includes instructions to confirm that a minimum percentage of request packets are over a specified byte size.

6. The machine of claim 1 wherein the memory storing instructions executed by the processor includes instructions to deem domain name system tunnel activity after confirming that a minimum percentage of request packets are over a specified byte size and a minimum percentage of response packets are over another specified byte size.

7. The machine of claim 1 wherein a request type is used in determining threshold values.

8. The machine of claim 1 wherein the memory storing instructions executed by the processor include instructions to apply or invoke counter-measures.

9. The machine of claim 8 wherein the counter-measures include domain access restrictions.

10. The machine of claim 8 wherein the counter-measures include invoking a Response Policy Zone.

11. The machine of claim 8 wherein the counter-measures include alerts, notifications and log entries.

12. The machine of claim 8 wherein the memory storing instructions executed by the processor include instructions to collect metrics on source packets.

13. A machine, comprising:
a processor;
a network interface circuit connected to the processor and a network to collect network traffic; and
a memory connected to the processor, the memory storing instructions executed by the processor to
preserve a second level domain associated with the network traffic,
track requests in the network traffic for subdomains including unique subdomains of the second level domain,
determine a number of unique responses to the unique subdomains of the second level domain being queried,
determine an average size of a response payload for the unique responses, and
determine when a number of unique subdomains of the second level domain being queried exceeds a first threshold, when the number of unique responses to the unique subdomains of the second level domain being queried exceeds a second threshold, and when the average size of the response payload for the unique responses exceeds a third threshold to establish conditions indicative of domain name system data infiltration.

14. The f claim 13 wherein a request type is used in determining threshold values.

15. The machine of claim 13 wherein the memory storing instructions executed by the processor include instructions to apply or invoke counter-measures.

16. The machine of claim 15 wherein the counter-measures include domain access restrictions.

17. The machine of claim 15 wherein the counter-measures include invoking a Response Policy Zone.

* * * * *